United States Patent Office 3,478,088
Patented Nov. 11, 1969

3,478,088
METAL FLUOROCARBYL PHOSPHATES
Anthony J. Revukas, Cranford, N.J., assignor to Cities Service Oil Company, Bartlesville, Okla., a corporation of Delaware
No Drawing. Filed July 18, 1966, Ser. No. 565,756
Int. Cl. C07f 9/06, 7/28; C07d 109/00
U.S. Cl. 260—429.5
14 Claims

ABSTRACT OF THE DISCLOSURE

Novel metal fluorocarbyl phosphate compounds and gasoline compositions containing these compounds are disclosed. The novel compounds are selected from the group consisting of

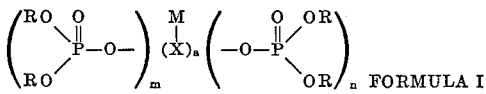
FORMULA I wherein M is a metal having a valence of from 2 to 6, each R is a radical separately selected from the group consisting of fluorocarbyl, hydrocarbyl and hydride radicals, X is a radical selected from the group consisting of halogen radicals, hydride and hydrocarbyl radicals, $m$ is an integer from 0 to 4, $n$ is an integer from 1 to 4, $a$ is an integer from 0 to 2 and is 0 when the valence of said metal M is 2, the sum of $m$ plus $n$ plus $a$ is equal to the valence of the metal M and is an integer from 2 to 6; and

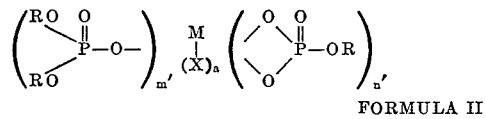
FORMULA II wherein R, M, X and $a$ are as defined above, $m'$ is an integer from 0 to 2, $n'$ is from 1 to 2 and the sum of $m'$ plus $2n'$ plus $a$ is equal to the valence of the metal and is an integer from 2 to 6; and

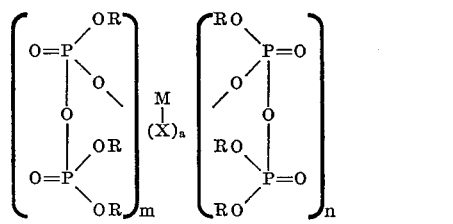
FORMULA III wherein M, R, X, $m$, $n$ and $a$ are as defined above; and

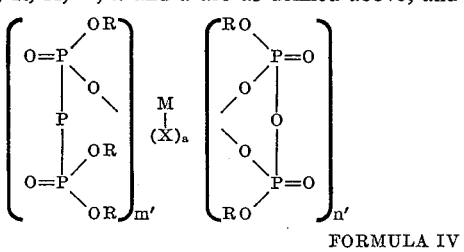
FORMULA IV wherein M, R, X $m'$, $n'$ and $a$ are as defined above.

At least one of the R radicals in each of the aforementioned compounds is a fluorocarbyl radical. Furthermore, according to a preferred embodiment of the invention, at least one R group in the compound is a hydride radical, whereby the compounds may be reacted with amines to form adducts characterized by exceptional solubility in gasoline compositions.

This invention relates to novel metal fluorocarbyl phosphate compounds, and in a more particular aspect to liquid hydrocarbon compositions, such as gasolene compositions, containing such compounds as additives.

Normally liquid hydrocarbon products, such as gasolene and like fuels, contain additives for improving their performance characteristics. Thus, in gasolene, additives are employed for improving various performance characteristics, such as to assist in maintaining cleanliness of the carburetor, to alleviate surface ignition, and for rust suppression and inhibition of carburetor icing. The additives vary in effectiveness and it is often necessary to use a number of additives in a single composition.

In accordance with my present invention, novel metal fluorocarbyl phosphates are provided which are beneficial as additives in liquid hydrocarbon compositions, particularly gasolene and other normally liquid hydrocarbon fuels. Particularly desirable compounds of the invention are those which contain at least one acid (—OH) radical bonded to a phosphorus atom, since such compounds may be reacted with amines to form amine adducts characterized by exceptional solubility in gasolene compositions. Thus, amine adducts of metal fluorocarbyl acid phosphates constitute the particularly preferred class of gasolene additives contemplated by the invention.

More particularly, the metal fluorocarbyl phosphates provided by my present invention are selected from the group consisting of:

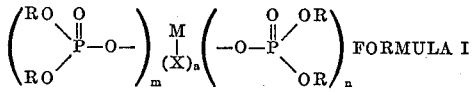
FORMULA I wherein M is a metal having a valence of from 2 to 6, each R is a radical separately selected from the group consisting of fluorocarbyl, hydrocarbyl and hydride radicals, X is a radical selected from the group consisting of halogen radicals, hydride and hydrocarbyl radicals, $m$ is an integer from 0 to 4 and $n$ is an integer from 1 to 4, $a$ is an integer from 0 to 2 and is 0 when the valence of said metal M is 2, the sum of $m$ plus $n$ plus $a$ is equal to the valence of the metal M and is an integer from 2 to 6; and

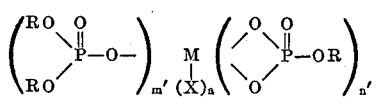
FORMULA II wherein R, M, X and $a$ are as defined above, $m'$ is an integer from 0 to 2, $n'$ is from 1 to 2 and the sum of $m'$ plus $2 n'$ plus $a$ is equal to the valence of the metal and is an integer from 2 to 6; and

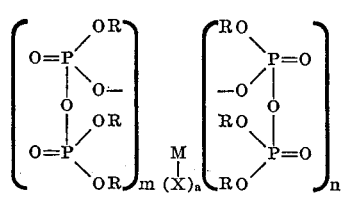
FORMULA III wherein M, R, X, $m$, $n$ and $a$ are as defined above; and

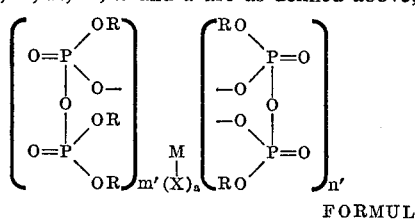
FORMULA IV wherein M, R, X, $m'$, $n'$ and $a$ are as defined above.

At least one of the R radicals in each of the aforementioned compounds is a fluorocarbyl radical. Furthermore, according to a preferred embodiment of the invention, at least one R group in the compound is a hydride radical, whereby the compounds may be reacted with amines to form adducts characterized by exceptional solubility in gasolene compositions.

The fluorocarbyl radicals of the present compounds contain at least one fluorine atom and from one (1) to about thirty (30) carbon atoms. For instance, the fluorocarbyl radicals may be those corresponding to the formula:

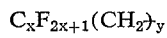

where each of $x$ and $y$ are at least one (1) and the sum of $x+y$ does not exceed about 15. Preferably, $x$ in the above formula is from 2 to 9 and the sum of $x+y$ is from 3 to 12. Furthermore, the value of $y$ in the above formula is preferably from 1 to 3. Representative fluorocarbyl radicals of this type are: 1H,1H-heptafluoro-butyl; 1H,1H,2H,2H-heptafluoro-pentyl; 1H,1H-heneicosafluoro-undecyl; 1H,1H,2H,2H,3H,3H-nonafluoro-heptyl; 1H,1H-tridecafluoro-heptyl; 1H,1H,2H,2H - tridecafluoro-octyl; 1H,1H,2H,2H-heneicosafluoro-dodecyl; 1H,1H - undecafluoro-hexyl; 1H,1H-pentafluoro-propyl; 1H,1H-heptafluoro-butyl and 1H,1H-trifluoro-ethyl.

Other suitable fluorocarbyl radicals are those corresponding to the formula:

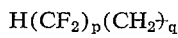

wherein each of $p$ and $q$ are at least one (1) and the sum of $p$ and $q$ does not exceed about 15. Preferably, $p$ in the above formula is from two (2) to nine (9) and the sum of $p+q$ is from 3 to 12. Furthermore, $q$ preferably ranges from 1 to 3. Representative fluorocarbyl radicals of this type are: 1H,1H,3H-tetrafluoro-propyl; 1H,1H,2H,2H,3H,3H,11H-hexadecafluoro - undecyl; 1H,1H,9H-hexadecafluoro-nonyl; 1H,1H,7H - dodecafluoro-heptyl; 1H,1H,6H-decafluoro-hexyl; 1H,1H,2H,2H,6H-octafluoro-hexyl; 1H,1H,5H - octafluoro - pentyl; 1H,1H,4H-hexafluoro-butyl; and 1H,1H,10H-octadecafluoro-decyl.

Another suitable class of fluorocarbyl radicals are those represented by the formula:

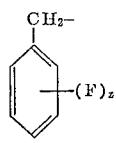

wherein $z$ is from 1 to 5. Illustrative of fluorocarbyl radicals of this type is 2,3,4,5,6-pentafluorophenyl-1-methylene.

In the aforementioned Formulae I–IV, at least one R radical may be a hydrocarbyl radical containing from about 1 to about 30 carbon atoms. The hydrocarbyl radicals may be alkyl, alkenyl, aryl, alkylaryl, arylalkyl or alicyclic hydrocarbon radicals, athough when the compounds of the invention are to be utilized as gasolene additives, the acyclic hydrocarbyl radicals, and particularly the branched-chain aliphatic hydrocarbyl groups of from six (6) to twenty-two (22) carbon atoms are preferred.

Exemplary of suitable hydrocarbyl radicals are: ethyl, propyl, isopropyl, butyl, isobutyl, tert-butyl, pentyl, isopentyl, hexyl, isohexyl, 2,2,4-trimethylpentyl, 3-methylpentyl, 2,2-dimethylbutyl, 2,3-dimethylbutyl, heptyl, isoheptyl, 3-methylhexyl, 3,3-dimethylpentyl, octyl, 2,3-dimethylhexyl, 2,4-dimethylhexyl, 2-ethylhexyl, 2-ethylbutyl, nonyl, decyl, undecyl, dodecyl, tridecyl, tetradecyl, pentadecyl, hexadecyl, heptadecyl, octadecyl, nonadecyl, eicosyl, hencosyl, docosyl, tricosyl, tetracosyl, pentacosyl, hexacosyl, heptacosyl, octacosyl, nonacosyl, tricontyl, phenyl, naphthyl, benzyl, o-cresyl, m-cresyl, dodecylphenyl, octylphenyl, ethylphenyl, diphenyl, β-phenylethyl, ω-phenylhexyl, cyclohexyl, cyclobutyl, cyclodecyl, cyclopentyl, butenyl, octenyl, 2,3-dimethyl-pentenyl, 2-ethylhexenyl, linoleyl, oleyl, etc.

X in the above formulae represents a radical selected from the group consisting of halides, hydride and hydrocarbyl radicals. The preferred halide radical is chloride, while the preferred hydrocarbyl radicals are those containing from about 1 to about 30 carbon atoms, particularly aliphatic hydrocarbyl radicals containing from about 2 to about 10 carbon atoms. There may be from 0 to 2 X radicals bonded to the central metal atom of the present compounds, although when the valence of the metal is 2, there are preferably no X radicals attached thereto. However, when the valence of the metal is greater than four, i.e. 5 or 6, there is preferably 1 or 2 X radicals bonded to the metal.

The metal M in the above Formulae I–IV represents a polyvalent metal having a valence of 2 to 6. Suitable meteals include manganese, silicon, copper and gold and the metals of Groups II, IV, VI–B, and VIII of the Periodic Table (see pages 392–393 of the Handbook of Chemostry and Physics, 35th edition, 1953). For the purposes of the present invention, silicon is to be considered a metal. The tetravalent metals of Group IV–B are preferred, particularly titanium.

Compounds having especially desirable characteristics for use as gasolene additives are those represented by the formula:

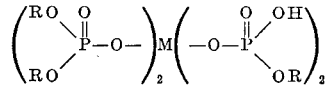

wherein M is a Group IV–B metal, e.g. titanium, R is selected from the group consisting of fluorocarbyl radicals of the formula: (a) $C_xF_{2x+1}(CH_2)_y$ where $x$ is from 2 to 9, $y$ is from 1 to 3 and the sum of $x$ plus $y$ is from 3 to 12; (b) $H(CF_2)_p(CH_2)_q$ where $p$ is from 2 to 9, $q$ is from 1 to 3 and the sum of $p$ plus $q$ is from 3 to 12; and (c)

wherein $z$ is from 1 to 5, and aliphatic acyclic hydrocarbyl radicals containing from about 6 to about 22 carbon atoms, at least one R radical being a fluorocarbyl radical, and the amine adducts of such compounds.

The metal fluorocarbyl phosphates may be prepared by any suitable method. For example, in accordance with one procedure, the compounds may be prepared by reacting in suitable mole ratios, phosphorus pentoxide, a metallic halide and a fluoroalkanol, with or without organic hydroxy compounds in which the hydroxy radical is attached to a $C_1$ to $C_{30}$ hydrocarbyl radical. Table 1, below, sets forth the relative molar quantities of reactants required to prepare representative types of metal fluorocarbyl orthophosphates and pyrophosphates. In Table 1, the identity of the hydrocarbyl radicals (R) present in the compounds is determined by the identity of the hydrocarbyl radical present in the organic hydroxy reactant, and the identity of the fluorocarbyl radicals (R') is determined by the identity of the fluorocarbyl radicals present in the fluoroalkanol reactant:

TABLE 1

| Compound | Formula | Reactants (moles) | | | |
|---|---|---|---|---|---|
| | | Metal Halide | P₂O₅ | Fluoro-alkanol | C₁ to C₃₀ Hydrocarbyl Hydroxy compound |
| Metal (II) mono [di (fluorocarbyl) orthophosphate] mono [monoacid mono (fluorocarbyl) orthophosphate]. | 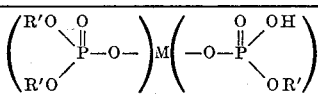 | 1 | 1 | 3 | 0 |
| Metal (III) mono [di (hydrocarbyl) orthophosphate] mono [mono (fluorocarbyl) orthophosphate]. | 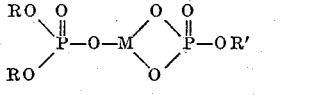 | 1 | 1 | 1 | 2 |
| Metal (IV) bis [di (fluorocarbyl) orthophosphate] bis [monoacid mono (fluorocarbyl) orthophosphate]. | 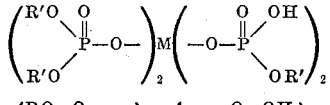 | 1 | 2 | 6 | 0 |
| Metal (IV) bis [di (hydrocarbyl) orthophosphate] bis [monoacid mono (fluorocarbyl) orthophosphate]. | 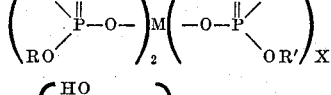 | 1 | 2 | 2 | 4 |
| Metal (II) bis [monoacid mono (fluorocarbyl) mono (hydrocarbyl) pyrophosphate]. | 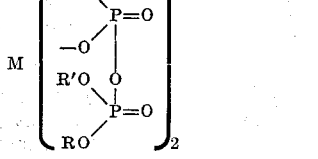 | 1 | 2 | 2 | 2 |
| Metal (II) mono [di (flourocarbyl) pyrophosphate] | 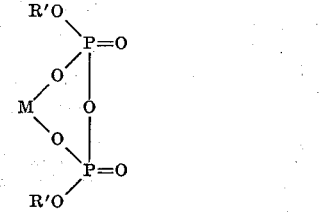 | 1 | 1 | 2 | 0 |
| Metal (III) mono [monoacid di (fluorocarbyl) [pyrophosphate] mono [mono (hydrocarbyl) mono (fluorocarbyl) pyrophosphate]. | 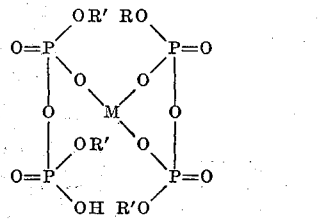 | 1 | 2 | 3 | 1 |
| Metal (IV) tetra [monoacid di (fluorocarbyl) pyrophosphate]. | 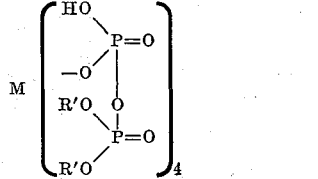 | 1 | 4 | 8 | 0 |

In preparing the compounds, the reactants may be simply mixed together at a temperature from about 10° C. to about 120° C. in an inert solvent. The inert solvent is preferably an aliphatic or aromatic hydrocarbon such as benzene, toluene, heptane, octane, hexane, etc. Other suitable inert solvents are ethers and halogenated hydrocarbons, e.g. ethyl ether, tetrahydrofuran, carbon tetrachloride, chlorobenzene, etc.

In addition to the single stage preparatory procedure, just-noted, the novel compounds of the invention may be prepared by reacting phosphorous pentoxide with the fluoroalkanol, with or without a hydroxy compound containing from 1 to 30 carbon atoms, in a first reaction stage, followed by reaction of the resulting mono- or di-acid fluorocarbyl phosphate with metal halide in a second reaction stage.

The reaction mixtures resulting from either the above-noted preparatory procedures may or may not contain minor quantities of additional compounds, not all of which have been entirely identified, in addition to the desired metal fluorocarbyl phosphate compounds. Regardless of their identity, these extraneous compounds do not appear to impair the effectiveness of the metal fluorocarbyl phosphate compounds of the present invention as gasolene additives, and therefore, need not be separated therefrom. Furthermore, although generally desirable, it is not necessary to separate the compounds prior to use from the solvent in which they are prepared.

As previously noted, particularly desirable gasolene additives are the reaction products of amines with the metal fluorocarbyl phosphates containing at least one acid (—OH) radical bonded to a phosphorus atom. These amine adducts are prepared by neutralizing the free (—OH) group(s) of the metal fluorocarbyl acid phosphate. Formation of the adduct is generally optimized at temperatures between about 15° C. and 60° C., although higher or lower temperatures may also be used. Preferably, each acid (—OH) group of the metal fluorocarbyl acid phosphate is neutralized with basic nitrogen of the amine reactant, although this is not absolutely essential.

The amine employed in preparing the amine adducts of the present invention can be any salt-forming amine having from about 1 to about 30 carbon atoms. Thus primary, secondary or tertiary aliphatic or aromatic amines may be used. Heterocyclic amines can also be used. The amine can also be a mono-, di-, tri- or other polyamine. Furthermore, the amine may be a β-amine, and may contain various substituent groups, such as hydroxyl groups. Preferred amines utilized in the practice of the present invention are aliphatic mono- or polyamines containing from about 6 to about 22 carbon atoms.

Illustrative of suitable amines for preparing the amine adducts of the metal fluorocarbyl acid orthophosphates and pyrophosphates there can be mentioned methylamine, ethylamine, diethylamine, propylamine, tripropylamine, isopropylamine, butylamine, isobutylamine, hexylamine, 2-ethylhexylamine, octylamine, dodecylamine, 2-propyldecylamine, pentadecylamine, tetradecylamine, octadecylamine, 6-butyloctadecylamine, eicosamine, dimethyl-i-propylmethylamine, 8-hexyl-10-isobutyl octadecylamine, dioctylamine, tribenzylamine, hexadecylamine, decylamine, N-hexyloctylamine, N,N-dimethyldodecylamine, oleylamine, linoleylamine, 1,10-decamethylenediamine, ethylenediamine, 1,2-propylenediamine, 1,12-dodecamethylenediamine, tetramethylenediamine, 1,6-hexamethylenediamine, triethylenetetramine, benzylamine, 3,3 - biphenyldiamine, biphenylamine, 1-naphthylamine, 1-fluorenamine, aniline, N-methylaniline, N,N-dimethylaniline, 2,3-phenylenediamine, piperazine, piperidine, furfurylamine, 3-azabicyclo[3.2.2]nonane, N-cyclohexylheptylamine, and the like. The amines can also contain various substituent groups such as hydroxyl groups, e.g. alkanol amines, such as diethanolamine, 3,3′-hydroxydipropanolamine, isopropanolamine, and the like. β-amines, such as octyl-β-amine, can also be used. Mixtures of amines may also be used to prepare the amine adducts of the present invention. For instance, cocoamine, which is a mixture of amines prepared from coconut oil fatty acids and contains predominently n-dodecylamine, and soya amine which is a mixture of amines containing from 16 to 18 carbon atoms, are especially useful.

The following representative compounds are included for the purpose of illustrating various metal fluorocarbyl phosphates and amine adducts of metal fluorocarbyl acid phosphates contemplated by the invention.

Illustrative of metal II fluorocarbyl phosphates and amine adducts of metal II fluorocarbyl acid phosphates are the following:

calcium bis [di (1H,1H,6H-decafluoro-hexyl) orthophosphate]
beryllium bis [monoacid mono (1H,1H,10H-actadecafluoro-decyl) orthophosphate]
beryllium bis [mono (cocoammonium) mono (1H,1H-tridecafluoro-heptyl) orthophosphate]
magnesium bis [monoacid di (1H,1H-heneicosafluoro-undecyl) pyrophosphate]
barium mono [di (1H, 1H-heptafluoro-butyl) orthophosphate] mono [monoacid mono (2,3,4,5,6-pentafluorophenyl-1-methyl) orthophosphate]
zinc bis [tri (1H,1H,10H-octadecafluoro-decyl) pyrophosphate]
cadminum mono [di (2-ethylhexyl) orthophasphate] mono [mono (oleylammonium) mono (1H,1H,3H-tetrafluoro-propyl) orthophosphate]
copper bis [monoacid mono (1H,1H-undecafluoro-hexyl) orthophosphate]
the adduct of ethylenediamine and copper mono [di (1H,1H,10H-octadecafluoro-decyl) orthophosphate] mono [monoacid mono (1H,1H,10H-octadecafluoro-decyl) orthophosphate]
nickel bis [monoacid mono (1H,1H-trifluoro-ethyl) mono (isopropyl) pyrophosphate]
iron bis [mono (oleylammonium) mono (1H,1H,9H-hexadecafluoro-nonyl) mono (ethylphenyl) pyrophosphate]
iron mono [di (1H,1H,4H-hexafluoro-butyl) orthophosphate] mono [monoacid mono (1H,1H,4H-hexafluoro-butyl) orthophosphate]
cobalt bis [mono (isodecyl) di (1H,1H-heptafluoro-butyl) pyrophosphate]
manganese bis [di (1H,1H,2H,2H-heptafluoro-pentyl) orthophosphate]
manganese bis [mono (1H,1H,2H,2H,3H,3H,11H-hexadecafluoroundecyl) di (butyl) pyrophosphate]
barium bis [mono (propylammonium) mono (1H,1H,7H-dodecafluoroheptyl) orthophosphate]
palladium bis [mono (isoheptyl) di (1H,1H,2H,2H,3H, 3H-nonafluoroheptyl) pyrophosphate]
chromium mono [mono (cyclohexylammonium) di (1H,1H,2H,2H-tridecafluoro-octyl) pyrophosphate] mono [tri (1H,1H,2H,2H-tridecafluoro-octyl) pyrophosphate]
osmium bis [tri (1H,1H-pentafluoro-propyl) pyrophosphate]
strontium mono [di (1H,1H,2H,2H,6H-octafluoro-hexyl) orthophosphate] mono [monoacid mono (1H,1H,2H,2H,6H-octafluoro-hexyl) orthophosphate]
strontium mono [di (1H,1H,2H,2H-heneicosafluorododecyl) pyrophosphate]

Illustrative of metal III fluorocarbyl phosphates and amine adducts of metal III fluorocarbyl acid phosphates are the following:

gold mono [di (propyl) orthophosphate] mono [mono (1H,1H-tridecafluoro-heptyl) orthophosphate]
iron mono [di (1H,1H,2H,2H,3H,3H-nonafluoroheptyl) orthophosphate] mono [mono (1H,1H,2H,2H,3H,3H-nonafluoroheptyl) orthophosphate]
iron tri [monoacid mono (1H,1H-heneicosafluoroundecyl) orthophosphate]
the adduct of aniline and iron tri [monoacid mono (1H,1H-heptafluorobutyl) orthophosphate]
nickel mono [mono (linoleylammonium) mono (1H,1H,3H-tetrafluoro-propyl) orthophosphate] mono [mono (1H,1H,3H-tetrafluoro-propyl) orthophosphate]
nickel mono [mono (cocoammonium) di (1H,1H,9H-hexadecafluoro-nonyl) pyrophosphate] mono [di (1H,1H,9H-hexadecafluoro-nonyl) pyrophosphate]
nickel mono [di (isobecyl) orthophosphate] mono [mono (1H,1H,10H-octadecafluoro-decyl) orthophosphate]
cobalt tri [monoacid mono (1H,1H,2H,2H,6H-octafluoro-hexyl) orthophosphate]
cobalt mono [tri (1H,1H-heneicosafluoro-undecyl) pyrophosphate] mono [mono (cyclohexyl) mono (1H,1H-heneicosafluoro-undecyl) pyrophosphate]
ruthenium mono [di (1H,1H,2H,2H-tridecafluoro-ocytl) orthophosphate] mono [mono (1H,1H,2H,2H-tridecafluoro-octyl) orthophosphate]
ruthenium mono [tri (2,3,4,5,6-pentafluorophenyl-1-methyl) pyrophosphate] mono [mono (O-cresyl) mono (2,3,4,5,6-pentafluorophenyl-1-methyl) pyrophosphate]
osmium mono [tri (1H,1H,7H-dodecafluoro-heptyl) pyrophosphate] mono [di (1H,1H,7H-dodecafluoroheptyl) pyrophosphate]
rhodium mono [mono (tridecylammonium) mono (1H,1H-undecafluoro-hexyl) orthophosphate]
iridium mono [di (1H,1H,2H,2H-heptafluoro-pentyl)

orthophosphate] mono [mono (1H,1H,2H,2H-heptafluoro-pentyl) orthophosphate]
chromium tri [monoacid mono (1H,1H,5H-octafluoro-pentyl)orthophosphate]
chromium tri [mono (2-ethylbutylammonium) mono (1H,1H,4H-hexafluoro-butyl) orthophosphate] mono [mono (1H,1H,4H-hexafluoro-butyl) orthophosphate]
titanium mono [tri (1H,1H,6H-decafluoro-hexyl) pyrophosphate] mono [di (1H,1H,6H-decafluoro-hexyl) pyrophosphate]
titanium mono [di (2-ethylhexyl) orthophosphate] mono [mono (1H,1H,2H,2H-heneicosafluoro-dodecyl) orthophosphate]
the adduct of 3-azabicyclo [3.2.2] nonane and titanium mono [monoacid mono (1H,1H-heptafluoro-butyl) orthophosphate] mono [mono (1H,1H-heptafluoro-butyl) orthophosphate]

Illustrative of the metal IV fluorocarbyl phosphates and amine adducts of metal IV fluorocarbyl acid phosphate are the following:

manganese bis [di (1H,1H,6H-decafluoro-hexyl) orthophosphate] bis [monoacid mono (1H,1H,6H-decafluoro-hexyl) orthophasphate]
manganese bis [di (1H,1H-tridecafluoro-heptyl) pyrophosphate]
titanium bis [di 1H,1H,5H-octafluoro-pentyl) orthophosphate] bis [mono (cocoammonium) mono (1H,1H,5H-octafluoro-pentyl) orthophosphate]
titanium bis [di (isodecyl) orthophosphate] bis [mono (cocoammonium) mono (1H,1H,5H-octafluoro-pentyl) orthophosphate]
the adduct of 3-azabicyclo [3.2.2] nonane and titanium tetra [monoacid mono (1H,1H-heptafluoro-butyl) orthophosphate]
titanium tetra [monoacid di (1H,1H,10H-octadecafluoro-decyl) pyrophophate]
hafnium tetra [monoacid di (1H,1H-heneicosafluoro-undecyl) orthophosphate]
hafnium bis [mono (2,3,4,5,6-pentafluorophenyl-1-methyl) orthophosphate]
zirconium bis [di (1H,1H,2H-heptafluoro-pentyl) pyrophosphate]
zirconium tetra [mono (1-propenyl) mono (1H,1H, 2H,2H-tridecafluorooctyl) orthophosphate]
ruthenium bis [mono (1H,1H,9H-hexadecafluoro-nonyl)mono (isononyl) pyrophosphate]
ruthenium tetra [di (1H,1H-pentafluoro-propyl) orthophosphate]
platinum bis [di (1H,1H,2H,2H-heneicosafluoro-dodecyl) orthophosphate] bis [monoacid mono (1H,1H,5H-octafluoro-pentyl) orthophosphate]
the adduct of ethylenediamine and osmium tetra [monoacid di (1H,1H,3H-tetrafluoro-propyl) pyrophosphate]
tin bis [mono (1H,1H,2H,2H-tridecafluoro-octyl) orthophosphate]
germanium tetra [mono (1-butenyl) mono (1H,1H,4H-hexafluoro-butyl) orthophosphate]
lead bis [di (1H,1H-trifluoro-ethyl) pyrophosphate]
cyclohexyl silicon mono [di (2-ethylhexyl) orthophosphate] mono [mono (1H,1H,7H-dodecafluoro-heptyl) orthophosphate]
dibutyl tin mono [di (1H,1H,5H-octafluoro-phenyl) orthophosphate] mono [monoacid mono (2-ethylhexyl) orthophosphate]
monohydrogen, monomethyl silicon di [monoacid mono (1H,1H,5H-octafluoro-pentyl) orthophosphate]

Illustrative of metal (V) fluorocarbyl phosphates and amine adducts of metal (V) fluorocarbyl acid phosphates are:

dichloromolybdenum tri [di (1H,1H,6H-decafluoro-hexyl) orthophosphate]
dichloromolybdenum tri [mono (cocoammonium) mono (1H,1H,2H,2H-heptafluoro-pentyl) orthophosphate]

Illustrative of metal VI fluorocarbyl phosphates and amine adducts of metal (VI) fluorocarbyl phosphates is 3-azabicyclo[3.2.2]nonane adduct of dibutyl tungsten tetra[monoacid mono (1H, 1H, 5H - octafluoro-pentyl) orthophosphate].

When used as gasolene additives, the metal fluorocarbyl phosphates and amine adducts of the metal fluorocarbyl acid phosphates are generally dissolved in the gasolene in an amount between about 1 and about 1500 parts per million parts of gasolene by weight. The gasolene can be either leaded or unleaded. However, in accordance with a preferred embodiment of the invention, a gasolene compositon is provided which comprises a major portion of leaded hydrocarbon base fuel boiling in the gasolene range and containing between about 0.001 and about 5.0 theories of the present additives (e.g. from about 5 to about 800 or more parts of additive per million parts of gasolene by weight). The leaded hydrocarbon base fuel comprises at least 50 volume percent and preferably at least 75 volume percent of the gasolene composition.

As previously noted, the preferred gasolene additives are the amine adducts of metal fluorocarbyl acid phosphates, particularly those corresponding to the formula:

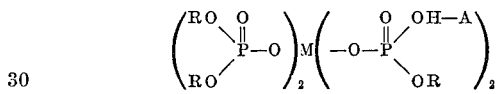

wherein M is a Group IV–B metal, e.g. titanium, R is a radical selected from the group consisting of fluorocarbyl and hydrocarbyl, at least one R being a fluorocarbyl radical, and A represents an amine.

It will be understood that the terms "gasolene," "hydrocarbon base boiling in the gasolene range" and similar terms refer to a petroleum fraction boiling in the gasolene range, (e.g. between about 50° F. and about 450° F.). The term "leaded" gasolene refers to a gasolene to which there has been added a small amount of organometallic anti-knock compound such as tetraethyl lead (TEL), tetramethyl lead (TML) or tetraisopropyl lead, etc., such as between about 0.1 and about 6.0 grams Pb per gallon of gasolene.

The term "theory" as used herein is intended to designate the amount of additives of the present invention that would be needed in a leaded gasoline in order that the metal and phosphorus atoms of the additive would be able to react stoichiometrically with all of the lead in the lead anti-knock compound present in the gasoline to form the appropriate lead compound upon combustion in an engine. The "theory" concept may be based on the metal only, on the phosphorus only, or on both of these elements in the additive. Thus, for example, the additive titanium bis[di (isodecyl) orthophosphate] bis [monoacid mono (1H,1H,5H - octafluoro - pentyl) orthophosphate] could react with TEL or TML to produce lead orthophosphate and lead titanate. In this example, the theories of additive employed would be based on the phosphorus required to form lead orthophosphate and on the metal, titanium, to produce lead titanate. If the metal in the metal fluorocarbyl phosphate additive does not combine with the lead in the gasolene to form a compound upon combustion in engine, then the theory concept is based on the phosphorus in the additive. To illustrate, nickel bis [di (1H,1H,5H-octafluoro-pentyl) orthophosphate] in a gasolene with TEL forms only lead orthophosphate upon the combustion, as no compounds of lead with nickel are known to exist.

In addition to the above-described compounds, gasolene compositions contemplated by the present invention may include one or more other ingredients such as lead scavangers, gum inhibitors, lubricants, rust inhibitors, metal deactivators or other special purpose additive.

Lubricants suitable for use in the above-described gasolene compositions may include, for instance, light hydrocarbon lubricating oils having viscosities at 100° F. of between about 50 and about 200 Saybolt Universal Seconds (SUS) and viscosity indexes (VI) of between about 30 and about 120 with oils having a viscosity of about 100 SUS at 100° F. being preferred. Such oils may be present in suitable amounts, such as between about 0.1 and about 1.0 volume percent of the gasolene composition.

When using lead compounds such as TEL, it is frequently found desirable to include in the gasolene composition a suitable lead scavanger for reducing the deposit of lead compounds within the combustion chamber. Such lead scavengers include, for example, halohydrocarbon compositions such as ethylene dibromide and ethylene dichloride.

Gum inhibitors suitable for use in the above-described gasolene compositions include conventional gum inhibitors such as 2,6-di-tert-butyl-p-cresol. Such gum inhibitors may be present in suitable amounts such as between about 0.001 and about 0.006 weight percent of the gasolene composition. Likewise, a suitable metal deactivator is, for example, N,N'-disalicylidene-1,2-diaminopropane.

Reference isnow made to the following non-limitative examples which serve to illustrate various specific metal fluorocarbyl phosphates contemplated by the invention, and gasolene compositions containing such compounds as additives.

EXAMPLE 1

To a reaction flask equipped with a mechanical stirrer, stoppered addition funnel, thermometer, gas inlet tube, and a reflux condenser protected with a drying tube, there are added 200 ml. of anhydrous benzene (solvent) and 17.8 grams (0.13 mole) of phosphorus pentoxide. With the stirrer operating at a rate to insure uniform dispersion, 11.7 grams (0.06 mole) of titanium tetrachloride is added next. Thereafter, 28.7 grams (0.12 mole) of 1H,1H,5H-octafluoro-1-pentanol and 40.8 grams (0.26 mole) of iso-decanol are added by means of the addition funnel at a rate such that the temperature of the reaction mixture does not rise about 30° C. The homogeneous reaction solution is then heated at 80°–85° C., and when evolution of HCl moderates, dry air is passed through the solution to displace the acid gas more rapidly and to accelerate the reaction. When evolution of HCl terminates, as revealed by Congo Red indicator, the benzene is removed by distillation in vacuo. About 81 grams of product is obtained, which represents a yield of 95%, based on $TiCl_4$. Upon analysis, the product is found to contain 3.49% titanium and 9.11% phosphorus, theory being 3.36% titanium and 8.69% phosphorus. The primary product is determined to be titanium bis [di (isodecyl) orthophosphate] bis [monoacid mono (1H,1H,5H-octafluoro-pentyl) orthophosphate], which has the following structural formula:

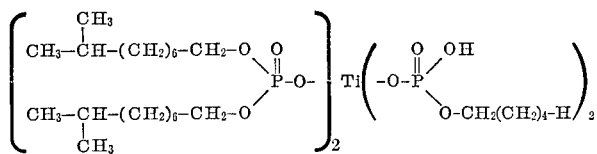

EXAMPLE 2

Titanium bis[di (1H,1H,5H-octafluoro-pentyl) orthophosphate] bis [monoacid mono (1H,1H,5H-octafluoro-pentyl) orthophosphate] is prepared following the general procedure of Example 1 by reacting the following in anhydrous benzene at a temperature of 82° C.:

| | G. |
|---|---|
| $TiCl_4$ (0.06 mole) | 11.7 |
| $P_2O_5$ (0.13 mole) | 17.8 |
| 1H,1H,5H-octafluoro-1-pentanol (0.37 mole) | 86.1 |

The yield of titanium bis[di(1H,1H,5H-octafluoro-pentyl)orthophosphate] bis [monoacid mono (1H,1H,5H-octafluoro-pentyl) orthophosphate] exceeds 90%.

EXAMPLE 3

To a reaction vessel protected against entry of moisture and equipped with a mechanical stirrer, thermometer, and addition funnel, there are added a mixture of 316.6 grams (2 moles) of isodecanol and 210 grams (1.05 moles) of 1H,1H-heptafluoro-1-butanol. A suspension of 142 grams (1 mole) of $P_2O_5$ in 400 ml. of benzene is added to the alcohol mixture in the reaction vessel at a rate such that the temperature stays below 40° C. After stirring for 16 hours, the solution is filtered to remove the slight turbidity. Four hundred (400) ml. of methanol is added to the filtrate and followed with 86 grams (2.2 moles) of NaOH dissolved in 200 ml. of water. The resulting solution is added in a thin stream to 262 grams (1.1 moles) of $NiCl_2 \cdot 6H_2O$ dissolved in 800 ml. of water in a vessel equipped with a mechanical stirrer and containing 1 liter of benzene. The reactants are stirred for two hours after the addition is completed and then the green benzene solution, containing the nickel mono [di(isodecyl) orthophosphate] mono [monoacid mono (1H,1H-heptafluoro-butyl) orthophosphate], is washed with water until free of chlorides. Finally the benzene is removed by distillation at about 35° C. and 25–35 mm. pressure. The yield of product is 94%. The reaction is formulated as follows:

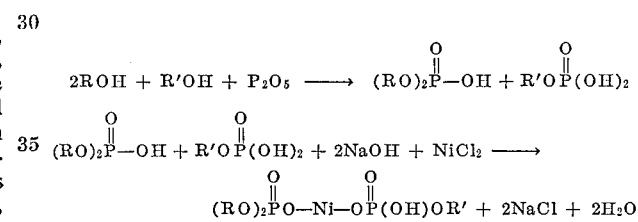

wherein R represents an isodecyl radical and R' represents a 1H,1H-heptafluoro-butyl radical.

EXAMPLE 4

In the manner described in Example 1, a mixture of 0.20 mole (28.4 grams) of $P_2O_5$, 0.05 mole (11.7 grams) of $ZrCl_4$ and 0.42 mole (98 grams) of 1H,1H,5H-octafluoro-1-pentanol are reacted in 250 ml. of anhydrous n-heptane to form zirconium tetra [monoacid di (1H,1H,5H-octafluoro-pentyl) pyrophosphate], which is represented by the following formula:

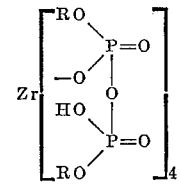

where R is the 1H,1H,5H-octafluoro-pentyl radical.

EXAMPLE 5

$P_2O_5$, in the amount of 28.4 grams (0.2 mole), and $GeCl_4$, in the amount of 21.4 grams (0.1 mole) are dispersed in 500 ml. of toluene. A blend, consisting of 33.2 grams (0.21 mole) of isodecanol and 73.5 grams (0.21 mole) of 1H,1H-tridecafluoro-1-heptanol, is then added to the toluene dispersion in the manner described in Example I. The reaction mixture is externally heated to 105° C., and when liberation of HCl is complete, the reaction mixture is distilled at reduced pressure to remove the solvent. The reaction product can be represented by the following formula:

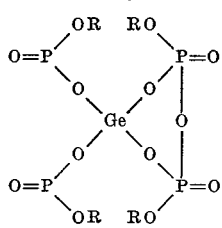

wherein two R radicals are 1H,1H-tridecafluoro-heptyl, and the other two R radicals are isodecyl.

EXAMPLE 6

Titanium tetra [mono (1H,1H,7H-didecafluoro-heptyl) mono (2-ethylhexyl) orthophosphate] is prepared by reacting 52.5 grams (0.10 mole) of mono (2-ethylhexyl) mono (1H,1H,7H-dodecafluoroheptyl) orthophosphoric acid with 4.8 grams (0.025 mole) of titanium tetrachloride in toluene solution at 105° C. The reaction product is represented by the following formula:

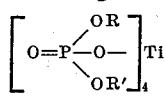

wherein R is a 2-ethylhexyl radical and R' is the $C_7$ fluoroalkyl group.

EXAMPLE 7

In the manner described in Example 1, 21.8 grams (0.10 mole) of cyclohexyltrichlorosilane, 14.2 grams (0.10 mole) of $P_2O_5$, 33.2 grams (0.21 mole) of isodecanol, and 33.2 grams (0.10 mole) of 1H,1H,7H-dodecafluoro-1-heptanol are reacted in 400 ml. of anhydrous toluene to produce cyclohexyl silicon (IV) mono [di (2-ethylhexyl) orthophosphate] mono mono (1H,1H,7H-didecafluoroheptyl) orthophosphate] which is formulated as follows:

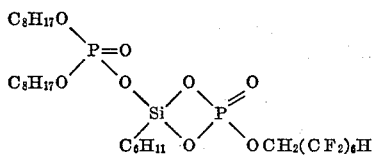

EXAMPLE 8

$P_2O_5$ in the amount of 28.4 grams (0.2 mole), and dibutyl tin dichloride in the amount of 60.8 grams (0.2 mole) are dispersed in 500 ml. of anhydrous toluene. A blend consisting of 26 grams (0.2 mole) of 2-ethyl-1-hexanol and 95 grams (0.41 mole) of 1H,1H,5H-octafluoro-1-pentanol is then added to the toluene dispersion in the manner described in Example 1. Heating of the reaction mixture under reflux, about 105°–110° C., is continued until evolution of HCl is completed. The solvent, and any slight amount of unreacted alcohol, is removed by distillation at reduced pressure, the final temperature being about 110°–120° C. at 15 mm. The product is dibutyl tin mono [di (1H,1H,5H-octafluoro-pentyl) orthophosphate] mono [monoacid mono (2-ethylhexyl) orthophosphate], which may be represented by the following formula:

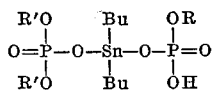

wherein the R' radicals are 1H,1H,5H-octafluoro-pentyl, R is 2-ethylhexyl, and Bu represents butyl.

EXAMPLE 9

Gasoline compositions are prepared by adding tetraethyl lead in the amount of 3.17 grams of Pb per gallon of gasolene and the titanium bis (di (isodecyl) orthophosphate] bis [monoacid mono (1H,1H,5H-octafluoro-pentyl) orthophosphate] product of Example 1 in the amounts noted in Table 2 below, to a base gasolene having the following characteristics:

Distillation:
```
    IBP _____ ° F__ 101
    10% evaporation _____ ° F__ 130
    20% _____ ° F__ 149
    30% _____ ° F__ 168
    50% _____ ° F__ 210
    70% _____ ° F__ 260
    90% _____ ° F__ 328
    End point _____ ° F__ 409
    Recovery _____percent__ 98.5
    Residue _____do____ 1
    Gravity _____° API__ 58.2
```

In order to test the surface ignition characteristics of the leaded gasolene compositions with and without additives, a single-cylinder spark-ignition engine equipped with an ionization gap to count flame fronts occurring before or after the normal flame is operated at 1000 r.p.m. with the throttle cycled 50 seconds at idle and 250 seconds at wide open for eight hours for each test. The average hourly surface ignition count for the last 4 hours of each test composition is compared to that of the leaded base fuel without the titanium fluorocarbyl phosphate additive and is reported on a percent reduction basis. The results are as follows:

Table 2.—Surface ignition alleviation

| Additive concentration, p.p.m.: | Percent reduction of surface ignition compared to leaded base gasolene |
|---|---|
| 200 (0.025 theory Ti) | 32 |
| 400 (0.05 theory Ti) | 73 |

It will be seen that the additives of the invention are effective in alleviating surface ignition.

The additives are also effective as rust suppressors. Thus, when ASTM rust tests are conducted at 70° F. using distilled water, the leaded base gasolene without the titanium fluorocarbyl phosphate additive fails the test, while the additive-containing compositions noted in Table 2 above, pass the test.

EXAMPLE 10

Twenty-five gram samples of the titanium bis[di (isodecyl) orthophosphate]bis[monoacid mono (1H,1H,5H-octafluoro-pentyl) orthophosphate] product of Example 1 are reacted with 10.9 grams of cocamine and 6.6 grams of 3 - azabicyclo[3.2.2]nonane, respectively, at room temperature to produce the respective amine adducts.

Finished gasolene compositions are prepared by adding the following ingredients to a base gasolene:

TABLE 3

| Ingredient | Control | Composition A | Composition B |
|---|---|---|---|
| TEL | 3.17 grams (Pb) per gal. | 3.17 grams (Pb) per gal. | 3.17 grams (Pb) per gal. |
| Cocamine adduct | | 50 p.p.m. | |
| 3-azabicyclo [3.2.2] nonane adduct. | | | 50 p.p.m. |

Compositions A and B pass the ASTM rust test using distilled water, while the control composition fails the test.

Furthermore, the carburetor detergency characteristics of Compositions A and B of Table 3 are compared to the leaded base fuel control composition. The test is run in a Ford engine wherein crankcase exhaust vapors are used to produce typical carburetor deposits. The engine is equipped with dual carburetors containing removable aluminum sleeves which are weighed before and after the test to determine the weight of accumulated deposit. Following each test, the aluminum sleeves and the throttle area are visually inspected, and a cleanliness rating is assigned on the basis of the color and texture of the deposits as well as the weight thereof. A cleanliness rating of 10 indicates no deposits, while a rating of 0 indicates heavy black deposits. The results of the carburetor detergency test are as follows:

TABLE 4

| Fuel | Mgs. Deposit Aluminum Sleeve | Cleanliness Rating (10=clean) | |
|---|---|---|---|
| | | Aluminum Sleeve | Throttle Area |
| Control (avg. of 2 runs) | 18 | 5.6 | 5.7 |
| Comp. A | 1 | 9.8 | 8.5 |
| Comp. B | 3 | 9.0 | 8.0 |

It will be seen that the gasolene compositions of the invention have excellent carburetor detergency characteristics.

While the invention has been described above with respect to certain preferred embodiments thereof, it will be understood by those skilled in the art that various changes and modifications may be made without departing from the spirit and scope of the invention.

Therefore, I claim:

1. A compound selected from the group consisting of:

$$\left(\begin{array}{c}RO\\ \diagdown\\ RO\end{array}\!\!\!\!>\!\!P\!\!-\!\!O-\right)_{m}\!\!\!\!\underset{(X)_{a}}{M}\!\!\!\!\left(-O-P\!\!<\!\!\!\!\begin{array}{c}OR\\ \diagup\\ OR\end{array}\right)_{n}$$

wherein M is a metal having a valence of from 2 to 6, each R is a radical separately selected from the group consisting of fluorocarbyl, hydrocarbyl, and hydride radicals, X is a radical selected from the group consisting of halide, hydride and hydrocarbyl radicals, m is an integer from 1 to 4, n is an integer from 0 to 4, a is an integer from 0 to 2 and is 0 when the valence of said metal M is 2, and the sum of m plus n plus a is equal to the valence of the metal M and is an integer from 2 to 6; and $$\left(\begin{array}{c}RO\\ \diagdown\\ RO\end{array}\!\!\!\!>\!\!P\!\!-\!\!O-\right)_{m'}\!\!\!\!\underset{(X)_{a}}{M}\!\!\!\!\left(\!\!\!\!\begin{array}{c}O\\ \diagup\\ O\end{array}\!\!\!\!>\!\!P\!\!-\!\!OR\right)_{n'}$$

wherein M, R, X and a are as defined above, m' is an integer from 0 to 2, n' is an integer from 1 to 2 and the sum of m' plus 2n' plus a is equal to the valence of the metal M and is an integer from 2 to 6; and $$\left[\left(\begin{array}{c}O=P\diagdown\!\!\!\!\!\!\begin{array}{c}OR\\ \\ OR\end{array}\\O=P\diagdown\!\!\!\!\!\!\begin{array}{c}OR\\ \\ OR\end{array}\end{array}\right)_{m}\!\!\!\!\underset{(X)_{a}}{M}\!\!\!\!\left(\begin{array}{c}RO\diagdown\!\!\!\!\!P=O\\ \\ RO\diagdown\!\!\!\!\!P=O\end{array}\right)_{n}\right]$$

wherein M, R, X, a, m and n are as defined above; and $$\left[\left(O=P\diagdown\!\!\!\!\!\!\begin{array}{c}OR\\ \\ OR\end{array}\right)_{m'}\!\!\!\!\underset{(X)_{a}}{M}\!\!\!\!\left(\begin{array}{c}RO\diagdown\!\!\!\!\!P=O\\ \\ RO\diagdown\!\!\!\!\!P=O\end{array}\right)_{n'}\right]$$

wherein M, R, X, a, m' and n' are as defined above; at least one R radical in each of said compounds being a fluorocarbyl radical.

2. Compound as in claim 1 wherein at least one R radical is hydrogen.

3. Compound as in claim 1 wherein said fluorocarbyl radical is selected from the group consisting of:

$$C_xF_{2x+1}(CH_2)_y$$

wherein each of $x$ and $y$ are at least 1 and the sum of $x$ plus $y$ does not exceed about 15; and $$H(CF_2)_p(CH_2)_q$$

wherein each of $p$ and $q$ are at least 1 and the sum of $p$ and $q$ does not exceed about 15; and

[benzyl ring with CH$_2$— substituent and (F)$_z$ substituents]

wherein $z$ is from 1 to 5.

4. Compound as in claim 1 wherein at least one R radical is a hydrocarbyl radical containing from about 1 to about 30 carbon atoms.

5. An amine adduct of the compound of claim 2, wherein said amine contains from about 1 to about 30 carbon atoms.

6. A compound having the formula:

$$\left(\begin{array}{c}RO\\ \diagdown\\ RO\end{array}\!\!\!\!>\!\!P\!\!-\!\!O-\right)_{2}\!\!\!\!M\!\!\!\!\left(-O-P\!\!<\!\!\!\!\begin{array}{c}OH\\ \\ OR\end{array}\right)_{2}$$

wherein M is a Group IV–B metal, R is a radical selected from the group consisting of hydrocarbyl radicals containing from about 1 to 30 cabon atoms and fluorocarbyl radicals selected from the group consisting of:

$$C_xF_{2x+1}(CH_2)_y$$

wherein $x$ is an integer from 2 to 9 and the sum of $x$ plus $y$ is an integer from 3 to 12; and $$H(CF_2)_p(CH_2)_q$$

wherein $p$ is an integer from 2 to 9 and the sum of $p$ plus $q$ is an integer from 3 to 12; and

[benzyl ring with CH— substituent and (F)$_z$ substituents]

wherein $z$ is an integer from 1 to 5; at least one of said R groups being a fluorocarbyl radical.

7. Compound as in claim 6 wherein M is titanium.

8. An amine adduct of the compound of claim 6, wherein said amine contains from about 6 to about 22 carbon atoms.

9. Compound of claim 6 wherein said hydrocarbyl radical is an acyclic hydrocarbyl radical containing from about 6 to about 22 carbon atoms.

10. Compound as in claim 6 wherein $y$ is an integer from 1 to 3 and $q$ is an integer from 1 to 3.

11. Compound as in claim 6 wherein M is titanium and at least one R radical is 1H,1H,5H-octafluoro-pentyl.

12. Compound as in claim 11 wherein one R radical is 1H,1H,5H-octafluoro-pentyl and two R radicals are isodecyl.

13. Compound as in claim 11 wherein all R radicals are 1H,1H,5H-octafluoro-pentyl.

14. An amine adduct of the compound of claim 11, wherein said amine contains from about 6 to about 22 carbon atoms.

References Cited

UNITED STATES PATENTS

| | | | |
|---|---|---|---|
| 2,341,565 | 2/1944 | Lyman et al. | 252—48 |
| 2,743,257 | 4/1956 | Church et al. | 260—45.75 |
| 2,877,251 | 3/1959 | Fox et al. | 260—431 |
| 2,884,431 | 4/1959 | Smith et al. | 260—429.9 |
| 2,959,544 | 11/1960 | Smith et al. | 252—32.7 |
| 3,050,538 | 8/1962 | Hugel et al. | 260—429 |
| 3,236,920 | 2/1966 | Hems et al. | 260—963 |
| 3,281,376 | 10/1966 | Proops | 260—2 |
| 3,290,342 | 12/1966 | Stern et al. | 260—429 |
| 3,338,935 | 8/1967 | Kerschner et al. | 260—429.5 |
| 3,346,492 | 10/1967 | Hess | 260—429 XR |
| 3,354,189 | 11/1967 | Revukus | 260—429.5 |

TOBIAS E. LEVOW, Primary Examiner

H. M. S. SNEED, Assistant Examiner

U.S. Cl. X.R.

44—68, 69, 72, 76, 79; 260—239, 242, 270, 347.7, 429, 429.3, 429.7, 429.9, 430, 435, 438.1, 438.5, 439, 448.2